US009803788B1

(12) United States Patent
Sorkin

(10) Patent No.: US 9,803,788 B1
(45) Date of Patent: Oct. 31, 2017

(54) PRESS-ON DUCT COUPLER ASSEMBLY

(76) Inventor: Felix L. Sorkin, Stafford, TX (US)

( * ) Notice: Subject to any disclaimer, the term of this patent is extended or adjusted under 35 U.S.C. 154(b) by 684 days.

(21) Appl. No.: 13/073,355

(22) Filed: Mar. 28, 2011

(51) Int. Cl.
*F16L 37/02* (2006.01)

(52) U.S. Cl.
CPC .................................. *F16L 37/02* (2013.01)

(58) Field of Classification Search
CPC ......... F16L 21/007; F16L 21/02; F16L 21/03; F16L 21/04; F16L 21/08; F16L 37/02; F16L 37/025; F16L 37/04; F16L 37/08; F16L 37/098; F16L 37/0987
USPC ................ 285/369, 349, 345, 336, 305, 233
See application file for complete search history.

(56) References Cited

U.S. PATENT DOCUMENTS

| | | | | |
|---|---|---|---|---|
| 3,368,830 A | * | 2/1968 | French | 285/110 |
| 3,637,239 A | * | 1/1972 | Daniel | 285/93 |
| 4,580,816 A | * | 4/1986 | Campbell et al. | 285/321 |
| 4,591,193 A | * | 5/1986 | Oltmanns et al. | 285/345 |
| 4,690,434 A | * | 9/1987 | Schmidt | 285/31 |
| 5,039,137 A | * | 8/1991 | Cankovic et al. | 285/236 |
| 5,180,197 A | * | 1/1993 | Thompson, Jr. | 285/351 |
| 5,320,319 A | | 6/1994 | Luthi | |
| 5,460,416 A | * | 10/1995 | Freidrich et al. | 285/146.1 |
| 5,474,335 A | | 12/1995 | Sorkin | |
| 5,722,702 A | * | 3/1998 | Washburn | 285/340 |
| 5,775,849 A | | 7/1998 | Sorkin | |
| 5,954,373 A | | 9/1999 | Sorkin | |
| 6,663,145 B1 | * | 12/2003 | Lyall et al. | 285/340 |
| 6,752,435 B1 | | 6/2004 | Sorkin | |
| 6,764,105 B1 | | 7/2004 | Sorkin | |
| 6,834,890 B2 | | 12/2004 | Sorkin | |
| 6,874,821 B1 | | 4/2005 | Sorkin | |
| 6,893,055 B2 | * | 5/2005 | Thomas et al. | 285/319 |
| 7,267,375 B1 | | 9/2007 | Sorkin | |
| 7,273,238 B1 | | 9/2007 | Sorkin | |

* cited by examiner

*Primary Examiner* — Matthieu F Setliff
*Assistant Examiner* — James A Linford
(74) *Attorney, Agent, or Firm* — Egbert Law Offices, PLLC

(57) ABSTRACT

A duct coupler has a body with an inner wall with a first channel and a second channel formed in the inner wall, a first seal received in the first channel, and a second seal received in the second channel. The body has a first open end suitable for receiving a first duct therein and a second open end at an opposite end thereof suitable for receiving the second duct therein in longitudinal alignment with the first duct. The first seal is suitable for bearing on an outer surface of the first duct. The second seal is suitable for bearing on the outer surface of the second duct. The body fixedly locks the first and second ducts therein such that the ends of the ducts are adjacent to each other and such that the body forms a liquid-tight seal with outer surfaces of the ducts.

5 Claims, 3 Drawing Sheets

PRESS-ON DUCT COUPLER ASSEMBLY

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a duct coupler. More particularly, the present invention relates to a coupler for providing a liquid-tight joint between adjacent sections of duct used to provide a channel for multi-strand post-tensioning of concrete structures. Additionally, the present invention relates to coupler that are easily positioned over ends of adjacent section of ducts.

BACKGROUND OF THE INVENTION

For many years, the design of concrete structures imitated the typical steel design of column, girder and beam. With technological advances in structural concrete, however, its own form began to evolve. Concrete has the advantages of lower cost than steel, of not requiring fireproofing, and of its plasticity, a quality that lends itself to free flowing or boldly massive architectural concepts. On the other hand, structural concrete, though quite capable of carrying almost any compressive load, is weak in carrying significant tensile loads. It becomes necessary, therefore, to add steel bars, called reinforcements, to concrete, thus allowing the concrete to carry the compressive forces and the steel to carry the tensile forces.

Structures of reinforced concrete may be constructed with load-bearing walls, but this method does not use the full potentialities of the concrete. The skeleton frame, in which the floors and roofs rest directly on exterior and interior reinforced-concrete columns, has proven to be most economic and popular. Reinforced-concrete framing is seemingly a quite simple form of construction. First, wood or steel forms are constructed in the sizes, positions, and shapes called for by engineering and design requirements. The steel reinforcing is then placed and held in position by wires at its intersections. Devices known as chairs and spacers are used to keep the reinforcing bars apart and raised off the formwork. The size and number of the steel bars depends completely upon the imposed loads and the need to transfer these loads evenly throughout the building and down to the foundation. After the reinforcing is set in place, the concrete, a mixture of water, cement, sand, and stone or aggregate, of proportions calculated to produce the required strength, is placed, care being taken to prevent voids or honeycombs.

One of the simplest designs in concrete frames is the beam-and-slab. This system follows ordinary steel design that uses concrete beams that are cast integrally with the floor slabs. The beam-and-slab system is often used in apartment buildings and other structures where the beams are not visually objectionable and can be hidden. The reinforcement is simple and the forms for casting can be utilized over and over for the same shape. The system, therefore, produces an economically viable structure. With the development of flat-slab construction, exposed beams can be eliminated. In this system, reinforcing bars are projected at right angles and in two directions from every column supporting flat slabs spanning twelve or fifteen feet in both directions.

Reinforced concrete reaches its highest potentialities when it is used in pre-stressed or post-tensioned members. Spans as great as one hundred feet can be attained in members as deep as three feet for roof loads. The basic principle is simple. In pre-stressing, reinforcing rods of high tensile strength wires are stretched to a certain determined limit and then high-strength concrete is placed around them. When the concrete has set, it holds the steel in a tight grip, preventing slippage or sagging. Post-tensioning follows the same principle, but the reinforcing tendon, usually a steel cable, is held loosely in place while the concrete is placed around it. The reinforcing tendon is then stretched by hydraulic jacks and securely anchored into place. Pre-stressing is done with individual members in the shop and post-tensioning as part of the structure on the site.

In a typical tendon tensioning anchor assembly used in such post-tensioning operations, there are provided anchors for anchoring the ends of the cables suspended therebetween. In the course of tensioning the cable in a concrete structure, a hydraulic jack or the like is releasably attached to one of the exposed ends of each cable for applying a predetermined amount of tension to the tendon, which extends through the anchor. When the desired amount of tension is applied to the cable, wedges, threaded nuts, or the like, are used to capture the cable at the anchor plate and, as the jack is removed from the tendon, to prevent its relaxation and hold it in its stressed condition.

Multi-strand tensioning is used when forming especially long post-tensioned concrete structures, or those which must carry especially heavy loads, such as elongated concrete beams for buildings, bridges, highway overpasses, etc. Multiple axially aligned strands of cable are used in order to achieve the required compressive forces for offsetting the anticipated loads. Special multi-strand anchors are utilized, with ports for the desired number of tensioning cables. Individual cables are then strung between the anchors, tensioned and locked as described above for the conventional monofilament post-tensioning system.

As with monofilament installations, it is highly desirable to protect the tensioned steel cables from corrosive elements, such as de-icing chemicals, sea water, brackish water, and even rain water which could enter through cracks or pores in the concrete and eventually cause corrosion and loss of tension of the cables. In multi-strand applications, the cables typically are protected against exposure to corrosive elements by surrounding them with a metal duct or, more recently, with a flexible duct made of an impermeable material, such as plastic. The protective duct extends between the anchors and in surrounding relationship to the bundle of tensioning cables. Flexible duct, which typically is provided in 20 to 40 foot sections, is sealed at each end to an anchor and between adjacent sections of duct to provide a water-tight channel. Grout then may be pumped into the interior of the duct in surrounding relationship to the cables to provide further protection.

Several approaches have been tried to solve the problem of quickly, inexpensively and securely sealing the joints between adjacent sections of duct used in multi-strand post-tensioned applications. However, all prior art devices have utilized a plurality of arcuate sections which must be assembled at a joint around the ends of adjacent duct sections. Wedges, compression bolts or the like then are used to compress the joined sections into sealing engagement with the duct and with each other. Such prior art devices have been cumbersome to use and have proved somewhat unreliable in their ability to exclude moisture or other corrosive elements from the interior of the ducts.

Several patents have issued relating to duct couplers. For example, U.S. Pat. No. 5,320,319, issued on Jun. 14, 1994 to K. Luthi, describes a coupling element which is fitted with chamfered flanges. The sheaths of the coupler have protrusions which are inserted into the coupling element with a tubular element which forms the end of the sheaths. A sealing ring is inserted between each of the flanges and protrusions of the sheaths. The flanges and the protrusions are held together by sloping surfaces and by a groove worked within each socket. Also, U.S. Pat. No. 5,474,335, issued on Dec. 12, 1995 to the present inventor, describes a duct coupler for joining and sealing between adjacent sections of the duct. The coupler includes a body, flexible cantilevered sections on the end of the body adapted to pass over annular protrusions on the duct and locking rings for locking the cantilevered flexible sections into position, so as to lock the coupler onto the duct.

U.S. Pat. No. 5,775,849, issued on Jul. 7, 1998 to the present inventor, describes a coupler as used for ducts in post-tension anchorage systems. This duct system includes a first duct having a plurality of corrugations extending radially outwardly therefrom, a second duct having a plurality of corrugations extending radially outwardly therefrom, and a tubular body threadedly receiving the first duct at one end and threadedly receiving the second duct at the opposite end. The tubular body has a first threaded section formed on an inner wall of the tubular body adjacent one end of the tubular body and a second threaded section formed on the inner wall of the tubular body adjacent an opposite end of the tubular body. The threaded sections are formed of a harder polymeric material than the polymeric material of the first and second ducts. The tubular body has an outer diameter which is less than the diameter of the ducts at the corrugations. The first and second threaded sections have a maximum inner diameter which is less than the outer diameter of the ducts at the end of the ducts. First and second elastomeric seals are affixed to opposite end of the tubular body and juxtaposed against a surface of a corrugation of the first and second ducts.

U.S. Pat. No. 5,954,373, issued on Sep. 21, 1999 to the present inventor, describes a different type of duct coupler apparatus. The duct coupler apparatus of this patent includes a tubular body with an interior passageway between a first open end and a second open end. A shoulder is formed within the tubular body between the open ends. A seal is connected to the shoulder so as to form a liquid-tight seal with a duct received within one of the open ends. A compression device is hingedly connected to the tubular body for urging the duct into compressive contact with the seal. The compression device has a portion extending exterior of the tubular body. The compression device includes an arm with an end hingedly connected to the tubular body and having an abutment surface adjacent the end. The arm is movable between a first position extending outwardly of an exterior of the tubular body and a second position aligned with an exterior surface of the tubular body. A latching member is connected to an opposite end of the arm and serves to affix the arm in the second position. The abutment surface of the arm serves to push a corrugation of the duct against the seal and against the shoulder so as to form a liquid-tight seal between the duct and the interior of the coupler.

U.S. Pat. No. 6,764,105, issued on Jul. 20, 2004 to the present inventor, describes a duct coupler apparatus for use with precast concrete segmental construction. This coupler has a first duct, a first coupler member extending over and around an exterior surface of the first duct and having a seat opening adjacent an end of the first duct, a second duct, a second coupler member extending over and around an exterior surface of the second duct and a seat opening adjacent to an end of the second duct, and gasket received in the seats of the first and second coupler members. An external seal is affixed to an opposite end of the first coupler member and affixed to an exterior surface of the first duct. The seats of the first and second coupler members have slots facing one another. The gasket is received within these slots.

U.S. Pat. No. 6,752,435, issued on Jun. 22, 2004 to the present inventor, describes a symmetrical coupler apparatus for use with precast concrete segmental construction. This coupler member has a first duct, a first coupler member extending over and around an exterior surface of the first duct and an end opening adjacent an end of the first duct, a second duct, a second coupler member extending over and around an exterior surface of the second duct and an end opening adjacent to an end of the second duct, and a gasket received in the ends of the first and second coupler members. The gasket serves to prevent liquid from passing between the ends of the coupler members into an interior of either of the first and second ducts. An external seal is affixed to an opposite end of the first coupler member and affixed to an exterior surface of the first duct. An internal seal is interposed in generally liquid-tight relationship between an interior surface of the second coupler member and an exterior surface of the second duct.

U.S. Pat. No. 6,834,890, issued on Dec. 28, 2004 to the present inventor, teaches a coupler apparatus for use with a tendon-receiving duct in a segmental precast concrete structure. This coupler apparatus includes a coupler body having an interior passageway for receiving the duct therein. The coupler body has a generally U-shaped channel formed at one end thereof. The coupler element has a connector element formed on interior thereof adjacent one end of the coupler body so as to allow the coupler element to receive a variety of implements for the formation of the precast concrete segment.

U.S. Pat. No. 6,874,821, issued on Apr. 5, 2005 to the present inventor, describes a coupler apparatus for use with angled post-tension cables in precast concrete segmental construction. This coupler apparatus has a first duct, a first coupler member extending over and around the first duct, a second duct, a second coupler member extending over and around the second duct and a gasket received at the ends of the first and second coupler members so as to prevent liquid from passing between the coupler members into an interior of either of the ducts. The ducts extend at a non-transverse acute angle with respect to the ends of the coupler members. Heat shrink seals are affixed to the opposite ends of the coupler member so as to secure the coupler members to the ducts in liquid-tight relationship. The ends of the coupler member have generally V-shaped grooves facing each other. The gasket is received in compressive relationship within the V-shaped grooves.

U.S. Pat. No. 7,273,238, issued on Sep. 25, 2007 to the present inventor, teaches a duct coupler apparatus with compressible seals. This apparatus is used for joining the ends of a pair of ribbed ducts together. The apparatus has a collar with an interior suitable for receiving the ends of the pair of ducts therein. A first coupler element is translatably secured adjacent a first end of the collar. A compressible seal is disposed between a surface of the first coupler element and the first end of the collar. A second coupler element is secured adjacent a second end of the collar. A second seal is disposed between a surface of the second coupler element and the second end of the collar. The coupler elements are translatable so as to compress the seal such that a surface of the seal will bear against a respective rib of the pair of ducts.

U.S. Pat. No. 7,267,375, issued on Sep. 11, 2007 to the present inventor, describes a duct coupler apparatus. This apparatus is for joining ends of a pair of ducts together in end-to-end relationship. The apparatus has a collar with a first end portion and a second end portion. A first coupler element is translatably secured to an exterior of the collar for moving the first end portion between first and second positions. A second coupler element is translatably secured to the exterior of the collar so as to move the second end portion between first and second positions. The end portions have a plurality of fingers that are movable so as to be free of the surfaces of the duct when in the first position and which contact a rib of the duct when in the second position. The collar and the coupler elements form a liquid-tight seal over the respective ends of the pair of ducts.

U.S. patent application Ser. No. 12/372,621, filed on Feb. 17, 2009 to the present inventor, describes a duct coupler having a generally tubular body with a first end and a second end. The body has an interior passageway extending from the first end to the second end. The first and second ends are each interiorly threaded. The body has an outer surface with a first lip extending longitudinally outwardly of the first end and a second lip extending longitudinally outwardly of the second end. A first ring seal is affixed against the inner surface of the body adjacent to the first lip. A second ring seal is affixed against an inner surface of the body adjacent to the second lip. The threads of the tubular are threadedly engaged with threads on the ends of the respective ducts.

FIGS. 1-3 herein describe the prior art coupler apparatus similar to that disclosed in U.S. Pat. No. 7,267,375. Referring to FIG. 1, there is shown the coupler apparatus 10 in of the prior art. The coupler apparatus 10 includes a collar 12, a first coupler element 14 and a second coupler element 16. A first duct 18 is received within the interior of the collar 12 and within the interior of the first coupler element 14. A second duct 20 is received within the collar 12 and within the interior of the second coupler element 16. The collar 12 has an interior suitable for receiving the ducts 18 and 20 in end-to-end relationship and in generally longitudinal alignment. The collar 12 has first end portion 22 at one end thereof and a second end portion 24 at an opposite end thereof. Each of the end portions 22 and 24 are movable between a first position (illustrated by end portion 24) spaced away from the interior of the collar 12 and a second position (illustrated by end portion 22) which extends toward the interior of the collar 12. The first coupler element 14 is translatably secured to the exterior of the collar 12. The first coupler element 14 is translatable so as to move the first end portion 22 between the first and second positions. The second coupler element 16 is also translatably secured to the exterior of the collar 12. The second coupler element 16 is tranlatable so as to move the second end portion 24 between the first and second positions.

As can be seen in FIG. 1, the first duct 18 has a plurality of ribs 26 formed thereon. Longitudinal channels 28 extend between the ribs 26 and allow liquid and grout therein to communicate between the ribs 26. Longitudinal channels 28 have an outer edge which is flush with the outer diameter of the respective ribs 26. The first duct 18 has an outer wall which extends between the ribs 26 and defines the interior of the duct 18. The second duct 20 similarly has a plurality of ribs 32, longitudinal channels 34 and wall 36. The first duct 18 is identical to the second duct 20. In normal use, the ducts 18 and 20 will receive tendons therein and allow a grout material to fill the interior thereof. The respective channels 28 and 34 allow grout to fill the interior of the respective ducts 18 and 20 and to flow into the ribs 26 and 32, respectively.

As can be seen, the first end portion 22 has a plurality of finger elements 38, 40, 42, 44 and 46 extending outwardly therefrom. In FIG. 1, for the purposes of illustration, the finger element 38 is illustrated in its second position which serves to lock the first duct 18 in its proper position. The finger element 22 has a lower surface 48 which will reside in surface-to-surface relationship with the wall 30 of duct 18. An extension element 50 extends outwardly as a tip from the finger element 38 so as to reside over the outer surface of the rib 26. An inclined surface extends between the tip 50 and the surface 48 so as to reside against the slanted surface of the rib 26. The remaining finger elements 40, 42, 44 and 46 are illustrated in the first position extending away from the surface of the duct. In normal use, the finger elements 38, 40, 42, 44 and 46 will move cooperatively relative to the translation of the first coupler element 14 on the collar 12.

The collar 12 has a plurality of finger elements 52, 54, 58, and 60 extending outwardly from an opposite end thereof of finger elements 22. Each of the finger elements 52, 54, 58, and 60 is illustrated in the first position spaced away from the exterior surface of the duct 20. The coupler element 16 is translatable relative to the collar 12 so as to move the finger elements 52, 54, 58, and 60 to the second position.

In FIG. 1, it can be seen that there is an indented portion 62 formed in the collar 12 generally between the ends of the ducts 18 and 20. The indented surface 62 will have an interior surface aligned with interior surface of the respective ducts 18 and 20.

The collar 14 is translatable about one end of the collar 12. The translating motion in the preferred embodiment of the present invention is established by a threaded relationship between the exterior surface of the collar 12 and the interior surface of the coupler 14. In other embodiments of the present invention, the coupler element 14 is translatable by slidable or ratcheting motion. Suitable hinging mechanisms or other cantilever or lever actions can be incorporated within the apparatus 10 so as to facilitate proper translatable motion of the coupler elements 14 and 16 on the collar 12. Coupler element 16 will have a configuration similar to that of coupler element 14 and will translate in the same manner as coupler element 14. Each of the coupler elements 14 and 16 has a plurality of ribs 64 formed on an exterior surface thereof. Each of the plurality of ribs 64 extends longitudinally for at least a portion of the length of the respective coupler elements 14 and 16. The plurality of ribs are radially spaced from each other around the diameter of the respective coupler elements 14 and 16. Ribs 64 facilitate the ability of a worker to grasp the exterior surface of the coupler elements 14 and 16 and to provide the necessary translatable motion with respect to the movement of the coupler elements 14 and 16 onto the respective end portions 22 and 24.

FIG. 2 illustrates the collar 12 as having the end portions 22 and 24 in the first position away from the respective ducts 18 and 20. In FIG. 2, the collar 12 is illustrated as having the indented portion 62 formed between the respective ends 66 and 68 of ducts 18 and 20. The inward surface of the indented portion 62 is in coplanar alignment with the inner surface 70 of duct 18 and inner surface 72 of duct 20. The collar 62 has an annular seal 74 extending around the interior of the collar 12. A second annular seal 76 is also affixed to the collar 12 and extends around the interior of the collar 12. The annular seals 74 and 76 can be formed of a suitable elastomeric material such that the seal 74 establishes a liquid-tight relationship with the rib 26 of duct 18. The annular seal 76 will establish a liquid-tight seal with the rib 32 of duct 20. It can be seen that the collar 12 has an inner surface which will generally abut the tops of the respective shoulders 26 and 32 of the ducts 18 and 20. As such, the ducts 18 and 20 can be easily installed within the interior of the collar 12 by slidably inserting the ends 66 and 68 of ducts 18 and 20 into opposite ends of the collar 62.

In FIG. 2, it can be seen that the collar 12 has a threaded exterior surface 78. The collar 12 also has another threaded exterior surface 80 formed thereon. The end portion 22 is integrally formed with the collar 12 at one end of the collar 12. The second end position 24 is also integrally formed with the collar 12 at the opposite end of the collar 12. The threaded portions 78 and 80 are respectively interposed between the indented portion 62 and the end portions 22 and 24. The end portion 22 has a shoulder 82 formed thereon. The end portion 24 also has a shoulder 84 formed thereon. Underlying surface 48 extends from shoulder 82 outwardly therefrom. Another underlying surface 86 is formed on the end portion 24 and extends outwardly from the shoulder 84. End surfaces 48 and 86 will extend generally upwardly at an acute angle with respect to a longitudinal axis of the collar 12. In FIG. 2, the first position of the end portions 22 and 24 is particularly illustrated. As such, the shoulders 82 and 84, along with the surfaces 48 and 86, will be generally spaced away from the respective ducts 18 and 20 so as to allow for the free insertion of the ends 66 and 68 of ducts 18 and 20 into the collar 12.

The first coupler element 14 is illustrated as having interior threads 88 engaged with the exterior threads 78 of the collar 12. The first coupler element 14 has an abutment end 90 extending into contact with a surface of the end portion. Similarly, the second coupler element 16 has an interior threaded section 92 threadedly engaged with the exterior threads 80 of the collar 12. An abutment end 94 is formed on the coupler element 16 so as to reside against the surface of the end portion 24.

FIG. 3 illustrates how the coupler elements 14 and 16 translate so as to move the end portions 22 and 24 into their second or locking positions. In normal use, the coupler elements 14 and 16 will be rotated so that the interior threads 88 will translate along the exterior threads 78 at one end of the collar 12. The second coupler element 16 will similarly have its interior threads 92 rotate with respect to the exterior threads 80. This causes the abutment end 90 of coupler element 14 to urge against the surface of the end portion 22 and to move the end portion 22 downwardly. As a result, the shoulder 82 will reside in contact (illustrated in broken line fashion) against a surface of rib 26. The second coupler element 16 will work in a similar manner so that the shoulder 84 will reside in contact against a surface of the rib 32. In this locked position, it will be impossible to pull the first duct 18 away from the second duct 20. A secure seal is formed between the interior surfaces of the collar 12 and the exterior surfaces of the ducts 18 and 20. The annular seal 74 and 76 will further provide a strong liquid-tight seal against the outer surfaces of the respective ducts 18 and 20.

It has been found with the prior art coupler apparatus illustrated in FIGS. 1-3 that it is often somewhat complicated to properly install the apparatus. In certain circumstances, the installation can be somewhat time consuming. As such, it has been found that there is a need to provide a coupler apparatus for ducts which allows workman at the construction site to easily connect the ends of the ducts through a use of a coupler. The coupler should be of a type that is suitable for effectively engaging the ends of the ducts in a liquid-tight manner. The coupler apparatus should have a minimum number of moving parts so as to effectively create the necessary seal while, at the same time, avoids complexities in the actual manufacturing injection molding of such a coupler apparatus.

It is an object of the present invention to provide a duct coupler that allows the ends of tendon-receiving ducts to be joined in a proper end-to-end relationship.

It is another object the present invention to provide a duct coupler that effectively establishes a liquid-tight seal between the respective coupled ducts.

It is another object of the present invention to provide a duct coupler which allows the coupler to be formed through an injection molding process.

It is still another object of the present invention to provide a duct coupler which allows the ducts to be effectively coupled in a minimal amount of time with minimum complexity.

It is another object of the present invention to provide a duct coupler that can be easily pressed over the ends of the ducts so as to join the ducts in end-to-end relationship.

It is still another object of the present invention to provide a duct coupler that effectively locks the ducts together in a liquid-tight relationship.

These and other objects and advantages of the present invention will become apparent from a reading of the attached specification and appended claims.

BRIEF SUMMARY OF THE INVENTION

The present invention is a duct coupler having a body with an inner wall. The body has a first channel and a second channel formed in the inner wall. This body has a first open end suitable for receiving a first duct therein and a second open end at an opposite end thereof suitable for receiving a second duct therein in longitudinal alignment with the first duct. A first seal is received in the first channel. The first seal extends inwardly from the first channel. The first seal is suitable for bearing on an outer surface of the first duct. A second seal is received in the second channel. The second seal extends inwardly from the second channel. The second seal is suitable for bearing on the outer surface of the second duct. The first seal will extend in a plane parallel to a plane in which the second seal extends.

In the present invention, the body of the duct coupler has a first ramp extending inwardly from the inner wall thereof. This first ramp defines a shoulder adjacent the first seal. The body has a second ramp extending inwardly from the inner wall thereof. The second ramp defines a shoulder adjacent the second seal. The first ramp extends from the inner wall for a greater distance at the first seal than a distance that the first ramp extends from the inner wall away from the first seal. The second ramp extends from the inner wall for a greater distance at the second seal than a distance that the second ramp extends from the inner wall away from the second seal. Each of the first and second ramps has an inclination relative to the inner wall. Each of the first and second ramps defines a surface with a constant angle of inclination extending from the inner wall to the shoulder. The shoulder extends angular inwardly from the seal.

The body has a first rib and a second rib formed in spaced relation to each other. The first and second ribs extending radially outwardly of the body. The first and second channels are formed in the inner wall of the body at the first and second ribs. The body has a portion extending between the first rib and the second rib. This portion has an inner wall extending inwardly for a distance greater than a distance of a remainder of the inner wall of the body.

Each of the first and second seals comprises a block affixed within the channel, and a protrusion extending inwardly from the block. The protrusion is suitable for bearing on the outer surface of the duct. The body is formed of a polymeric material. The first and second seals are each being formed of an elastomeric material. The body has an angled surface extending inwardly and spaced from and adjacent each of the first and second channels.

The present invention is also a duct assembly that comprises a first duct having an outer surface and an end, a second duct having an outer surface and an end, a body having an inner wall with a first channel and a second channel formed on the inner wall, a first seal received in the first channel, and a second seal received in the second channel. The body has a first open end at one end thereof and a second open end at an opposite end thereof. The first duct is received in the first open end. The second duct is received in the second open end. The first seal has a surface bearing on the outer surface of the first duct. The second seal has a surface bearing on the outer surface of the second duct.

In this duct assembly of the present invention, the first duct has at least one rib extending outwardly and therearound. The second duct has at least one rib extending outwardly and therearound. The first seal bears on a surface of the rib of the first duct. The second seal bears on a surface of the rib of the second duct. The rib of each of the first and second ducts has a first angled surface and a second angled surface.

The body has a first ramp formed on an inner wall thereof. This first ramp defines a shoulder bearing against the first angled surface of the rib of the first duct. The body has a second ramp formed on an inner wall thereof. The second ramp defines a shoulder bearing against the first angled surface of the rib of the second duct. The body has a first angled surface formed on the inner wall adjacent to the first seal. The body has a second angled surface formed on the inner wall adjacent to the second seal. The first angled surface of the body is in spaced relation to the second angled surface of the body. The second angled surface of the body is in spaced relation to the second angled surface of the rib of the second duct. The body has a central portion formed between the first channel and the second channel. The central portion extends between the rib of the first duct and the rib of the second duct. The first duct has a first rib and a second rib in spaced relationship to each other. The second duct has a first rib and a second rib in spaced relationship to each other. The first open end of the body overlies the second rib of the second duct. The second open end of the body overlies the second rib of the second duct.

In the present invention, the body fixedly locks the first and second ducts therein such that the end of the first duct is adjacent to the end of the second duct. The body forms a liquid-tight seal with the outer surface of the first duct and the second duct.

DETAILED DESCRIPTION OF THE INVENTION

Figure 1:
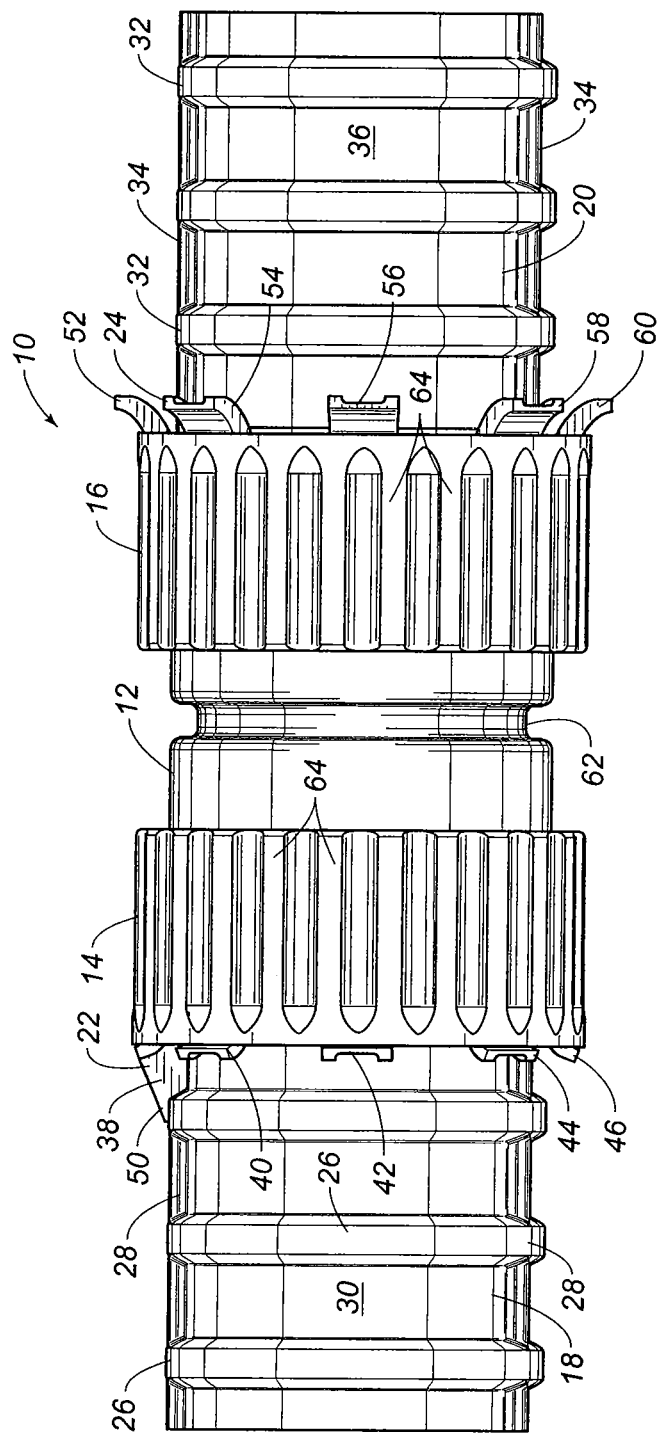
FIG. 1 is a side elevational view of a prior art duct coupler.
Figure 2:
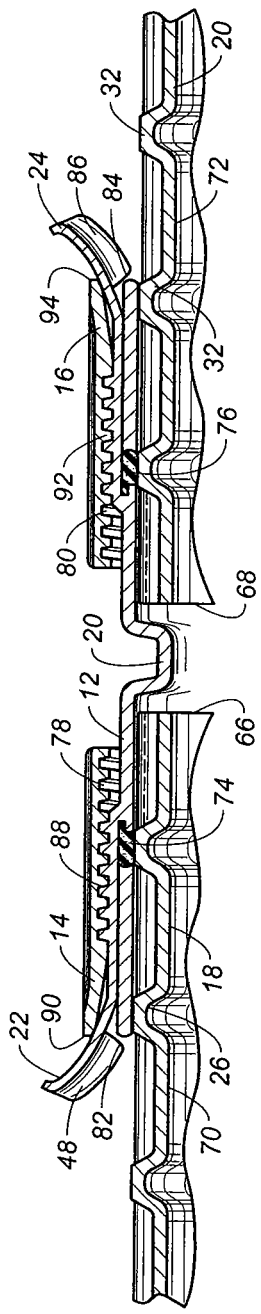
FIG. 2 is a cross-sectional view showing the end portions of the collar of the coupler apparatus of the prior art in a first position.
Figure 3:
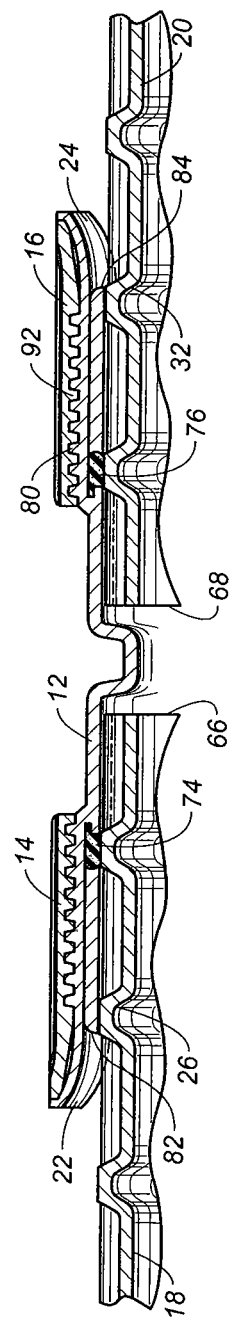
FIG. 3 is a cross-sectional view showing the end portions of the collar of the coupler of the prior art in the second locked position.
Figure 4:
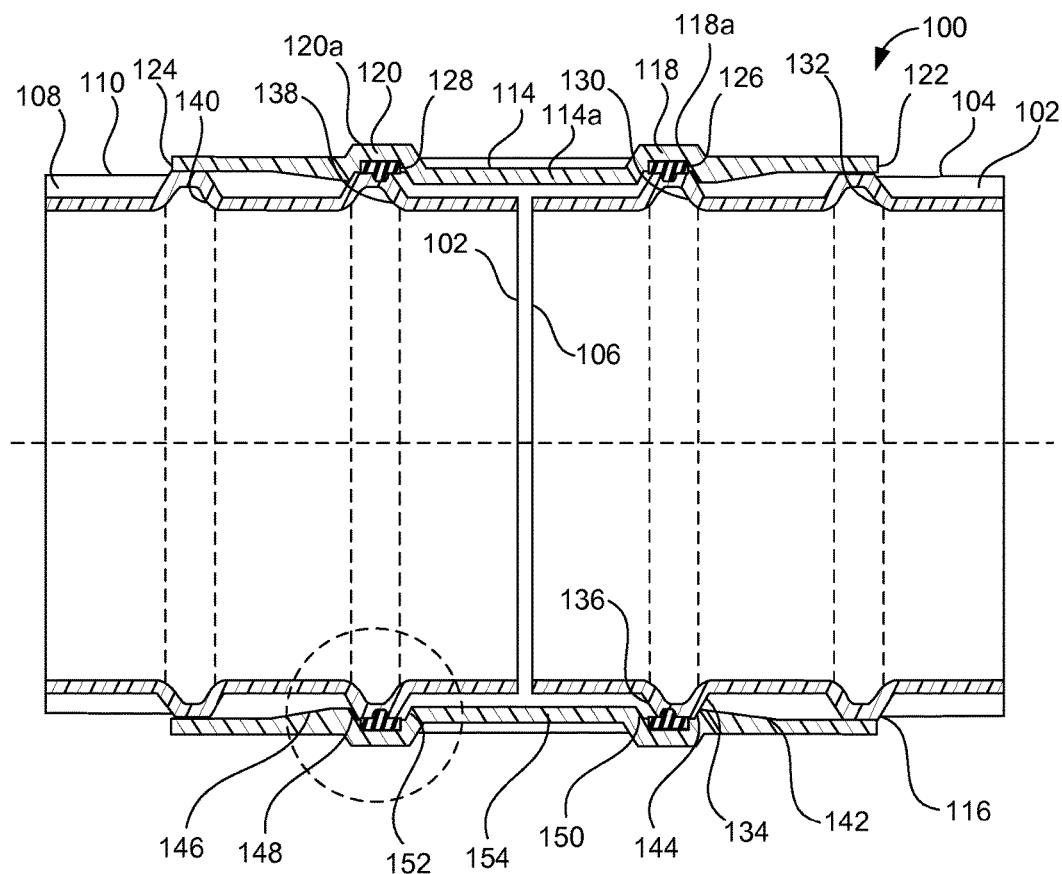
FIG. 4 is a cross-sectional view showing the duct coupler assembly in accordance with the preferred embodiment of the present invention.

Referring to FIG. 4, there is a shown the duct coupler assembly 100 in accordance the preferred embodiment of the present invention. The duct coupler assembly 100 has a first duct 102 having an outer surface 104 and an end 106, a second duct 108 having an outer surface 110 and an end 112, and a body 114 having an inner wall 116. The body 114 is a tubular body having a first channel 118 and a second channel 120 formed in the inner wall 116. The body 114 has a first open end 122 and a second open end 124 at opposite ends thereof. The first duct 102 is received in the first open end 122 of the body 114. The second duct 108 is received in the second open end 124 of the body 114. A first seal 126 is received in the first channel 118. The first seal 126 has a surface bearing on an outer surface of the first duct 102. A second seal 128 is received in the second channel 120. The second seal 128 is bearing on an outer surface of the second duct 108.

The first duct 102 is a tubular body formed of a polymeric material. In particular, the first duct 102 has a first rib 130 extending outwardly and therearound. The first duct 102 has a second rib 132 also extending outwardly and therearound. It can be seen that each of the first rib 130 and the second rib 132 have angled surfaces on opposite sides thereof and a generally flat surface at the outer surface thereof. Each of the ribs 130 and 132 are in generally spaced parallel relationship to each other. The first rib 130 is in spaced relationship to the first open end 122 of the duct 120. In particular, the first rib 130 has a first angled surface 134 and a second angled surface 136. These sides of the rib 130 are shown, in greater detail, in association with FIG. 5.

The second duct 108 also has a first rib 138 and a second rib 140 extending outwardly and therearound. The first rib 138 is planar parallel relationship to the second rib 140. The first rib 138 is generally spaced from the first open end 112 of the second duct 108. The ducts 102 and 108 are of a configuration that is commonly used in such multistrand and segmental construction. The configuration of the ducts 102 and 108 are known in the prior art. As such, the important feature of the present invention is the body 114 and its use in association with the ducts.

In FIG. 4, it can be seen that the body 114 is a generally tubular body that has an interior passageway suitable for receiving the ends 106 and 112 of the respective ducts 102 and 108 therein. The configuration of the present invention allows each of the ducts 102 and 108 to be properly locked in liquid-tight relationship within the interior passageway of the body 114.

Importantly, there is a ramp 142 formed on the inner wall 116 of the body 114. This ramp 142 defines a shoulder 144 bearing against the first angled surface 134 of the rib 130 of the first duct 102. The body 114 also includes a second ramp 146 formed on the inner wall 116 thereof. The second ramp 146 also defines a shoulder 148 bearing against an angled surface of the rib 138 of the second duct 108. In normal use, the duct 102 can be pushed into the open end 122 of the body 114. As such, the rib 130 will bear against the ramp 142 until the rib 130 passes the shoulder 144 of the ramp 142 and resides against the seal 126. The shoulder 144 effectively prevents the duct 102 from being pulled back outwardly. As such, duct 102 will effectively retained within the interior passageway of the body 114. Similarly, the second duct 108 can be pushed into the open end 124 of the body 114. As such, the rib 138 will be guided along the ramp 146 until the rib 138 passes shoulder 148 and then resides against the seal 128 in the channel 120. The body 114 has the first channel 118 formed within a first rib 118a and a second channel 120 formed within a second rib 120a. The ribs 118a and 120a are in spaced relation to each other with a portion 114a extending therebetween. The portion 114a has an inner diameter that is less than a remaining inner diameter of the body 114.

The body 114 includes an angled surface 150 formed on the inner wall 116 adjacent to the first seal 126. The body has a second angled surface 152 formed on the inner wall 116 thereof adjacent to the second seal 128. It can be seen that the first angled surface 150 is in spaced relationship to the second angled surface 136 of the rib 130 of the first duct 102. The second angled surface 152 is also illustrated as being in spaced relationship to an angled surface associated with the rib 138 of the second duct 108. This small gap effectively improves duct retention when the duct is bent. An effective liquid-tight seal occurs even if the ducts 102 and 108 are pushed toward one another within the interior of the body 114.

The body 114 also includes a central portion 154 formed on the inner wall 116 thereof between the first channel 118 and the second channel 120. This central portion 154 extends between the rib 130 of the first duct 102 and the rib 138 of the second duct 108. Since central portion 154 extends inwardly of the outer diameter of the respective ribs 130 and 138, this central portion 154 also effectively prevents the loss of the liquid-tight seal by blocking the inward movement of the duct 102 with respect to the other duct 108.

In FIG. 4, it can be seen that the body 114 has its first open end 122 overlying the outer surface of the second rib 132 of the first duct 102. Similarly, the second open end 124 of the body 114 overlies the outer surface of the second rib 140 of the second duct 108. The two points of contact between the body 114 and the respective ducts 102 and 108 assure longitudinal alignment to the ducts. It also assures the properly alignment of the respective seals with respect to the outer surfaces of the ribs 130 and 138. As such, the ends 106 and 112 of the respective ducts 102 and 128 will be retained in liquid-tight relationship adjacent to each other.

Figure 5:
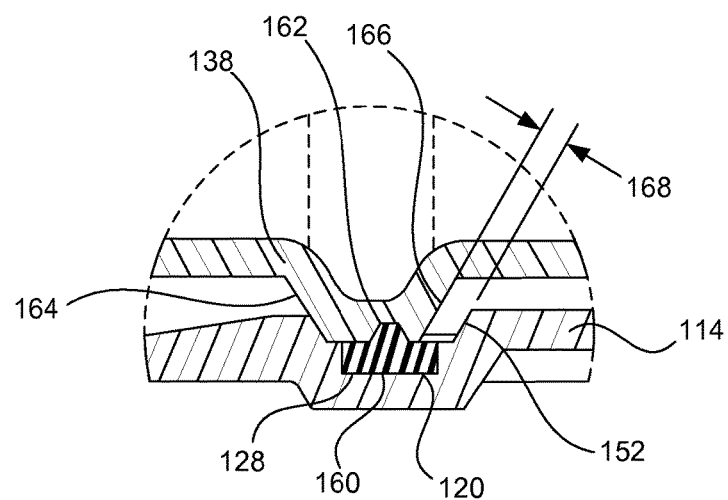
FIG. 5 is a magnified view of the circled area of FIG. 4.

In FIG. 5, there is shown a detailed view of the circled area of FIG. 4. In particular, the relationship between seal 128 and the rib 138 of the duct 108 is particularly illustrated. In particular, it can be seen that the seal 128 is received in the channel 120 formed in the inner wall 116 of the body 114. The seal 128 includes a block 160 that is received within the channel 120. A protrusion 162 extends inwardly from the block 106 so as to bear against the outer surface of the rib 138.

In FIG. 5, it can further be seen that the shoulder 148 at the end of the ramp 146 effectively bears against the angled surface 164 of the rib 138. Additionally, the angled surface 152 on the inner wall 116 of the body 114 is illustrated as being spaced from the angled surface 166 of the rib 138. A space 168 is defined between the angled surface 152 and the angled surface 166. In general, this will form a 0.10 inch gap so as to improve duct retention when the ducts are respectively bent.

Within the concept of the present invention, the body 114 and the ducts 102 and 108 are, preferably, formed of a polymeric material. The respective seals 126 and 128 are formed of an elastomeric material. The polymeric components can be easily formed through an injection molding process. Each of the seals 126 and 128 are annular members that effectively extend around the inner diameter of the body 114. In normal use, a plurality of tendons will extend through the interior passageways of the respective ducts 102 and 108. The ducts 102 and 108, along with the body 114, effectively prevents liquid intrusion from adversely affecting the integrity of the tendons which extend through the respective ducts. In order to install the ducts within the body 114, it is only necessary to push each of the ducts toward each other and into the interior of the body 114. Once each of the respective ribs of the ducts passes the shoulder of the ramp, a snap-sound should be heard and/or felt so as to effectively inform the installer that a proper connection has been achieved. As such, the installer receives both audio and tactile feedback during installation.

The foregoing description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A duct coupler for joining together a pair of ducts used in post-tension construction, the duct coupler comprising:
a tubular body having an inner wall, said tubular body having a first channel and a second channel formed in said inner wall, said tubular body having a first open end suitable for receiving a first duct therein and a second open end at an opposite end thereof suitable for receiving a second duct therein in longitudinal alignment with said first duct, said body having a first ramp formed on said inner wall of said tubular body, said first ramp being fixedly formed inwardly in spaced relation to said first open end, said first ramp being tapered so as to have a narrowest thickness spaced from said first open end of said tubular body and a wide thickness adjacent said first channel, said first ramp defining a first shoulder extending inwardly from said inner wall of said tubular body adjacent said first channel, said body having a second ramp formed on said inner wall of said tubular body, said second ramp being fixed formed inwardly in spaced relation to said second open end, said second ramp being tapered so as to have a narrowest thickness spaced from said second open end of said tubular body and a wide thickness adjacent said second channel, said second ramp defining a second shoulder extending inwardly from said inner wall of said tubular body adjacent to said second channel, said tubular body having a first rib and a second rib formed in spaced relation to each other, said first and second ribs extending radially outwardly of said tubular body, said first and second channels formed in said inner wall of said body within said first and second ribs, said tubular body having a portion extending between said first rib and said second rib, said portion having an inner diameter that is less than an inner diameter of a remainder of said inner wall of said tubular body, each of said first and second channels having a generally flat inner wall formed away from the inner wall of said tubular body;

a first seal received in said first channel, said first seal extending inwardly from said first channel, said first seal positioned adjacent said first shoulder, said first seal suitable for bearing on an outer surface of the first duct, said first seal seated in said first channel; and a second seal received in said second channel, said second seal extending inwardly from said second channel, said second seal positioned adjacent said second shoulder, said second seal suitable for bearing on an outer surface of the second duct, said second seal seated in said second channel, each of said first and second seals formed of an elastomeric material.

2. The duct coupler of claim 1, each of said first and second ramps having a constant angle of inclination.

3. The duct coupler of claim 1, said shoulder extending angularly away from the seal.

4. The duct coupler of claim 1, each of said first and second seals comprising:

a block affixed within the channel; and a protrusion extending inwardly from said block, said protrusion suitable for bearing on the outer surface of the duct.

5. The duct coupler of claim 1, said body being formed of a polymeric material.

* * * * *